US008447922B2

(12) United States Patent
Nakanishi et al.

(10) Patent No.: US 8,447,922 B2
(45) Date of Patent: May 21, 2013

(54) MEMORY CONTROLLER, NONVOLATILE STORAGE DEVICE, ACCESSING DEVICE, AND NONVOLATILE STORAGE SYSTEM

(75) Inventors: Masahiro Nakanishi, Kyoto (JP); Takashi Ogasawara, Osaka (JP)

(73) Assignee: Panasonic Corporation, Osaka (JP)

( * ) Notice: Subject to any disclaimer, the term of this patent is extended or adjusted under 35 U.S.C. 154(b) by 127 days.

(21) Appl. No.: 13/119,475

(22) PCT Filed: Jun. 30, 2010

(86) PCT No.: PCT/JP2010/004309
§ 371 (c)(1),
(2), (4) Date: Mar. 17, 2011

(87) PCT Pub. No.: WO2011/007511
PCT Pub. Date: Jan. 20, 2011

(65) Prior Publication Data
US 2011/0167209 A1 Jul. 7, 2011

(30) Foreign Application Priority Data
Jul. 16, 2009 (JP) .................................. 2009-167689

(51) Int. Cl.
*G06F 12/00* (2006.01)
(52) U.S. Cl.
USPC ............ 711/103; 711/E12.006; 711/E12.007; 711/E12.008
(58) Field of Classification Search
USPC ............ 711/103, E12.006, E12.007, E12.008
See application file for complete search history.

(56) References Cited

U.S. PATENT DOCUMENTS

| | | | | |
|---|---|---|---|---|
| 6,374,324 | B2 * | 4/2002 | Han | 711/103 |
| 6,938,116 | B2 * | 8/2005 | Kim et al. | 711/103 |
| 7,426,605 | B2 * | 9/2008 | Rudelic | 711/103 |
| 7,594,062 | B2 * | 9/2009 | In et al. | 711/103 |

(Continued)

FOREIGN PATENT DOCUMENTS

| | | |
|---|---|---|
| JP | 2002-366423 A | 12/2002 |
| JP | 2005-327296 A | 11/2005 |

(Continued)

OTHER PUBLICATIONS

Math World, "Natural Number", Jun. 4, 2000, pp. 1, http://web.archive.org/web/20000604110147/http://mathworld.wolfram.com/NaturalNumber.html.*
International Search Report for corresponding International Application No. PCT/JP2010/004309 mailed Sep. 28, 2010.

*Primary Examiner* — Edward Dudek, Jr.
*Assistant Examiner* — Christopher Birkhimer
(74) *Attorney, Agent, or Firm* — Renner, Otto, Boisselle & Sklar, LLP

(57) ABSTRACT

A memory controller, a nonvolatile storage device, an access device, and a nonvolatile storage system enable the storage architecture to be changed flexibly for intended use that can be changed variously. A nonvolatile storage system (100) sets a temporary area (23) and a normal access area of a nonvolatile memory (22) based on a use condition designated by a use condition designation unit (11) of an access device (1). This structure enables the nonvolatile storage system (100) to change the temporary area (23) and the normal access area (24) to be prepared in the nonvolatile memory (22) by changing the use condition in accordance with intended use. In other words, the nonvolatile storage system (100) enables the storage architecture to be changed flexibly for intended use that can be changed variously.

7 Claims, 9 Drawing Sheets

U.S. PATENT DOCUMENTS

| | | |
|---|---|---|
| 7,610,436 B2 | 10/2009 | Nakano |
| 7,739,443 B2 * | 6/2010 | Aizawa .................. 711/103 |
| 7,769,944 B2 * | 8/2010 | Luo et al. ................ 711/103 |
| 2002/0184436 A1 | 12/2002 | Kim et al. |
| 2005/0257017 A1 | 11/2005 | Yagi |
| 2006/0212646 A1 | 9/2006 | Nakano |
| 2006/0240357 A1 | 10/2006 | Martens et al. |
| 2010/0057976 A1 * | 3/2010 | Lasser ..................... 711/103 |

FOREIGN PATENT DOCUMENTS

| | | |
|---|---|---|
| JP | 2006-260468 A | 9/2006 |
| JP | 2008-102900 A | 5/2008 |
| JP | 2009-116465 A | 5/2009 |

* cited by examiner (a) Logical/physical address conversion table (for single-channel recording)

| | Logical block address | Physical block address |
|---|---|---|
| 1ch | 0x00A0 | 0x0010 | tb1

(b) Normal-access/temporary block management table (for single-channel recording)

| | Normal access block | Temporary block |
|---|---|---|
| 1ch | 0x0010 | 0x0500 | tb2

FIG. 4

(a) Logical/physical address conversion table (for multi-channel recording) tb3

| | Logical block address | Physical block address |
|---|---|---|
| 1ch | 0x0A10 | 0x0110 |
| 2ch | 0x0B20 | 0x0120 |
| 3ch | 0x0C30 | 0x0130 |
| 4ch | 0x0D40 | 0x0140 |

(b) Normal-access/temporary block management table (for multi-channel recording) tb4

| | Normal access block | Temporary block |
|---|---|---|
| 1ch | 0x0110 | 0x0510 |
| 2ch | 0x0120 | 0x0520 |
| 3ch | 0x0130 | 0x0530 |
| 4ch | 0x0140 | 0x0540 |

FIG. 5

(a) Part of memory area setting command for single-channel recording

| Multi-channel flag (=0) | Minimum used bandwidth |
|---|---|

(b) Part of memory area setting command for multi-channel recording

| Multi-channel flag (=1) | Channel number (=N) | Minimum used bandwidth for 1 ch | ..... | Minimum used bandwidth for N ch |
|---|---|---|---|---|

FIG. 9

MEMORY CONTROLLER, NONVOLATILE STORAGE DEVICE, ACCESSING DEVICE, AND NONVOLATILE STORAGE SYSTEM

TECHNICAL FIELD

The present invention relates to a memory controller, a nonvolatile storage device, and a nonvolatile storage system that enable data recording on a nonvolatile memory to be performed in an optimum manner for intended use.

BACKGROUND ART

A variety of recording media including magnetic disks, optical discs, and magneto-optical disks are recently used to store digital data, such as music content and video data. Among such recording media, memory cards that use semiconductor memories including flash ROMs as their recording elements are compact, and thus have become rapidly widespread mainly in compact portable devices, such as digital still cameras and mobile telephone terminals. In particular, semiconductor memories, which have conventionally been used as removable media like memory cards, have recently found application as built-in memories. For example, semiconductor memories, such as flash ROMs, are built in devices and used in place of hard disks.

Such a memory card or a built-in memory mainly uses a semiconductor device called a NAND-type flash memory, which is a recording element on which recorded data can be erased and new data can be recorded. Like a conventional hard disk, the NAND-type flash memory can be used to form an information recording device that is rewritable a plurality of number of times.

The NAND-type flash memory requires a relatively long time to write or erase data in a memory cell array, which is the unit in which data recording is performed. To shorten the time required for writing or erasing, the flash memory is formed in a manner that data stored in a plurality of memory cells can be erased at a time or data can be written into a plurality of memory cells at a time. More specifically, the NAND-type flash memory consists of a plurality of physical blocks (unit for erasure), each of which includes a plurality of pages (unit for writing). Data is erased from the flash memory in units of physical blocks, whereas data is written to the flash memory in units of pages.

Unlike a magnetic recording device such as a hard disk drive (HDD), the NAND-type flash memory does not allow data to be rewritten directly, but requires the data stored in the memory to be erased before new data is recorded (written) onto the memory. Moreover, the unit for erasure from the NAND-type flash memory is several hundreds kilobytes to several megabytes. To write data with a small size to the NAND-type flash memory, saving process in which valid data included in a physical block (block corresponding to the erasure unit) is copied into another block is executed. Due to the saving process, the recording speed of the NAND-type flash memory decreases when data is written in units smaller than the erasure unit. The recording speed of the NAND-type flash memory decreases significantly when, for example, data that can be updated frequently, such as directory entries or FAT data in the FAT file system, is rewritten.

A conventional technique known in the art reduces the need for the saving process by allocating a temporary block (log block) to data that can be updated frequently and writing such data into the allocated temporary block (see, for example, Patent Literature 1).

CITATION LIST

Patent Literature

Patent Literature 1: Japanese Unexamined Patent Publication No. 2002-366423

SUMMARY

Technical Problem

However, with the above conventional technique, the number of temporary blocks is fixed, or in other words the storage architecture is fixed. The conventional technique fails to enable data recording to be performed in an optimum manner for intended use. The data recording method is more advantageous if, for example, the number of temporary blocks (temporary area) or in other words the storage architecture can be changed depending on whether video and audio data (which may include text data) corresponding to a single channel is recorded onto a flash memory (single-channel recording) or video and audio data (which may include text data) corresponding to a plurality of channels is recorded onto a flash memory (multi-channel recording).

More specifically, (1) when video and audio data (which may include text data) corresponding to a single channel is recorded onto a flash memory, the number of temporary blocks (temporary area) should be reduced to increase the number of normal access blocks (normal access area) of the flash memory. This recording method is advantageous because this method increases the normal access area while guaranteeing a minimum data recording speed.

(2) When video and audio data (which may include text data) corresponding to a plurality of channels is recorded onto a flash memory, the number of temporary blocks (temporary area) should be increased to decrease the number of normal access blocks (normal access area). This recording method is advantageous because this method minimizes the decrease in the normal access area capacity while guaranteeing a minimum data recording speed at which the data corresponding to the plurality of channels is recorded simultaneously.

With the above conventional technique, the storage architecture is fixed. When, for example, both single-channel data recording and multi-channel data recording are to be performed, the above technique fails to enable data recording to be performed in an optimum manner for both the single-channel recording and the multi-channel recording. In other words, the above conventional technique fails to enable data recording to be performed in an optimum manner for intended use.

To solve the above problem, it is an object of the present invention to provide a memory controller, a nonvolatile storage device, an access device, and a nonvolatile storage system that enable the storage architecture to be changed flexibly for intended use that can be changed variously.

Solution to Problem

A first aspect of the present invention provides a memory controller that is connected to a nonvolatile memory and reads and writes data in accordance with an access command provided from an external unit. The memory controller includes a data read/write unit that controls reading and writing of data, a use condition receiving unit that receives a use condition designated by an external unit during formatting, a usable capacity determination unit that determines a usable capacity based on the received use condition, and a usable capacity notification unit that provides information about the usable capacity to an external unit.

This structure enables the memory controller to perform a preferred operation (for example, a preferred data writing operation) based on the use condition designated by the external unit during formatting.

A second aspect of the present invention provides a memory controller that is connected to a nonvolatile memory and reads and writes data from and to the nonvolatile memory in accordance with an access command provided from an external unit. The memory controller includes a data read/write unit, a use condition obtaining unit, a usable capacity determination unit, and a usable capacity obtaining unit.

The data read/write unit controls reading and writing of data from and to the nonvolatile memory. The use condition obtaining unit obtains information about a use condition of the nonvolatile memory from the access command provided from the external unit. The usable capacity determination unit determines a temporary area and a normal access area of the nonvolatile memory based on the information about the use condition of the nonvolatile memory obtained by the use condition obtaining unit, and provides an area preparation command for preparing the determined temporary area and the determined normal access area to the nonvolatile memory. The usable capacity obtaining unit obtains information about the temporary area and the normal access area prepared in the nonvolatile memory based on the area preparation command provided from the usable capacity determination unit.

The data read/write unit performs a data writing and/or reading process using the temporary area and the normal access area prepared in the nonvolatile memory.

This memory controller determines the temporary area and the normal access area of the nonvolatile memory based on the use condition of the nonvolatile memory, transmits, to the nonvolatile memory, a command for preparing the determined temporary area and the determined normal access area, and enables a data writing or reading process to be performed using the temporary area and the normal access area prepared in the nonvolatile memory. A nonvolatile storage system including this memory controller can change the temporary area and the normal access area prepared in the nonvolatile memory by changing the use condition in accordance with intended use. In other words, the nonvolatile storage system including this memory controller enables the storage architecture to be changed flexibly for intended use that can be changed variously.

A third aspect of the present invention provides the memory controller of one of the first and second aspects of the present invention in which the usable capacity determination unit determines the temporary area and the normal access area of the nonvolatile memory by determining the number of temporary blocks that are physical blocks to be included in the temporary area.

A fourth aspect of the present invention provides the memory controller of the third aspect of the present invention in which the usable capacity determination unit determines the temporary area and the normal access area of the nonvolatile memory by determining the number of temporary blocks as 1 when single-channel data consisting of data corresponding to a single channel is to be recorded onto the nonvolatile memory, and determining the number of temporary blocks as N when multi-channel data consisting of data corresponding to N channels (N is a natural number) is to be recorded onto the nonvolatile memory.

In this case, temporary blocks corresponding in one-to-one to the channels for which data is to be recorded are prepared. This reduces the need for the saving process (data integration process), and effectively prevents the data writing speed from decreasing.

A fifth aspect of the present invention provides a nonvolatile storage device including a nonvolatile memory including a temporary area including a variable memory area and a normal access area including a variable memory area, and the memory controller according to one of the first to fourth aspects of the present invention.

The memory area of the temporary area and/or the memory area of the normal access area included in the nonvolatile memory are determined in accordance with a command provided from the memory controller.

The nonvolatile storage device may be a nonvolatile storage module.

A sixth aspect of the present invention provides an access device that is connected to the nonvolatile storage device of the fifth aspect of the present invention, and formats the nonvolatile storage device, writes data to the nonvolatile storage device, and reads data from the nonvolatile storage device. The access device includes a use condition designation unit and a formatting unit.

The use condition designation unit transmits a use condition to the nonvolatile storage device to designate the use condition to be used by the nonvolatile storage device. The formatting unit transmits a command for formatting to the nonvolatile storage device based on a response to the designated use condition transmitted by the use condition designation unit. The response includes information about a usable capacity of a memory of the nonvolatile storage device that is determined by the nonvolatile storage device based on the use condition.

The access device may be an access module.

A seventh aspect of the present invention provides the access device of the sixth aspect of the present invention in which the use condition designation unit designates the use condition to be used by the nonvolatile storage device based on information including the number of temporary blocks to be included in the temporary area, and the usable capacity of the memory is a memory capacity of the normal access area that is set as an area remaining after excluding the temporary area that is determined using the number of temporary blocks from the entire memory area that is usable to read data and/or write data by the nonvolatile storage device.

An eighth aspect of the present invention provides a nonvolatile storage system including the nonvolatile storage device of the fifth aspect of the present invention, and the access device of one of the sixth and seventh aspects of the present invention.

Advantageous Effects

The memory controller, the nonvolatile storage device, the access device, and the nonvolatile storage system of the present invention enable data writing to be performed by an access device at a desired access speed.

BRIEF DESCRIPTION OF DRAWINGS

FIGS. 4A and 4B show examples of a logical/physical address conversion table and a normal-access/temporary block management table used in single-channel recording.

FIGS. 5A and 5B show examples of a logical/physical address conversion table and a normal-access/temporary block management table used in multi-channel recording.

FIGS. 9A and 9B show examples of a part of a memory area setting command.

Figure 1:
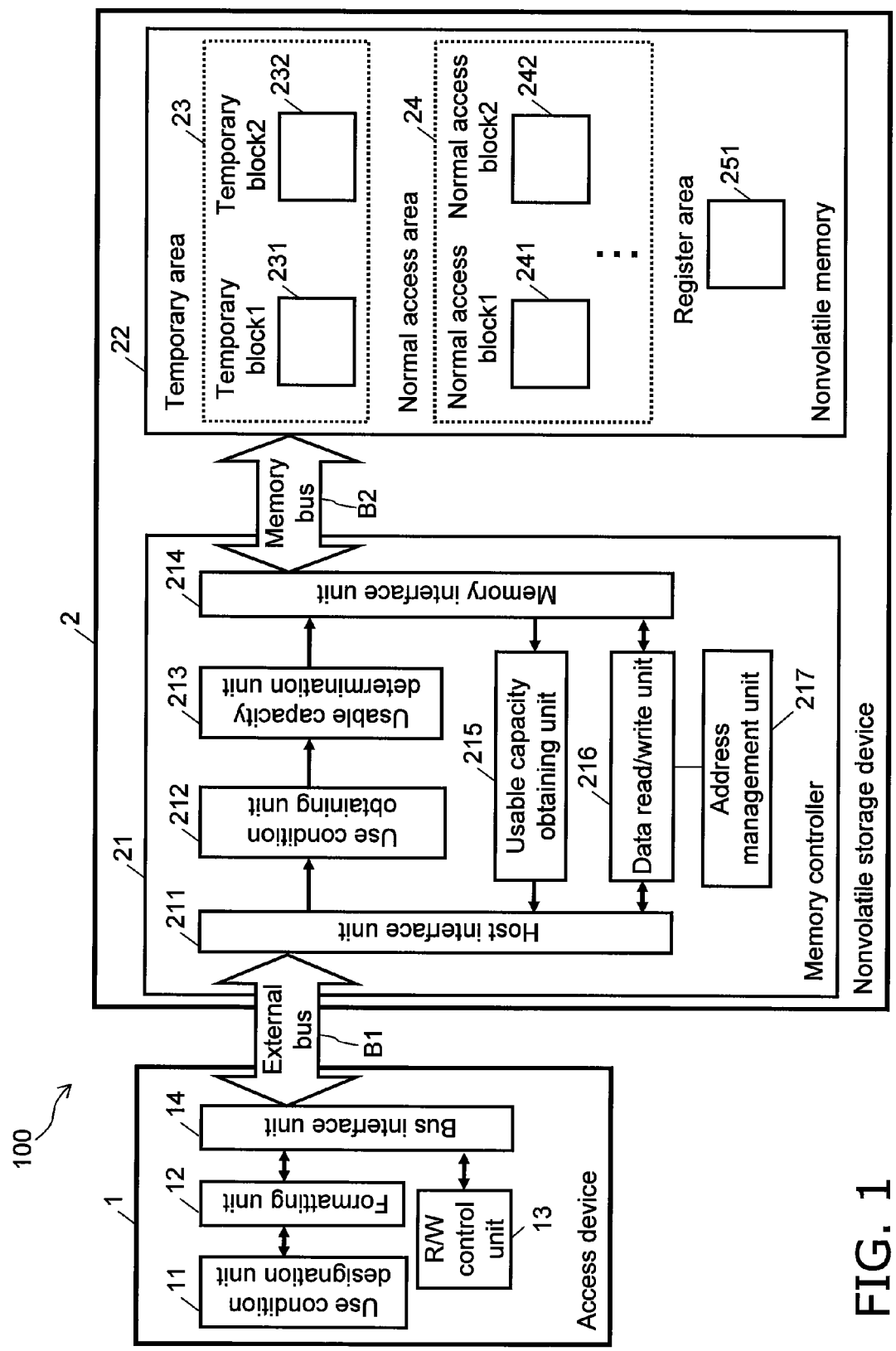
FIG. 1 is a schematic diagram showing the structure of a nonvolatile storage system 100 according to a first embodiment of the present invention.

REFERENCE SIGNS LIST 100 nonvolatile storage system
1 access device (access module)
11 use condition designation unit
12 formatting unit
13 R/W control unit
14 bus interface unit
2 nonvolatile storage device
21 memory controller
211 host interface unit
212 use condition obtaining unit
213 usable capacity determination unit
214 memory interface unit
215 usable capacity obtaining unit
216 data read/write unit
217 address management unit
22 nonvolatile memory
23 temporary area
231 temporary block
24 normal access area
241 normal access block
251 register area

DESCRIPTION OF EMBODIMENTS

Embodiments of the present invention will now be described with reference to the drawings.

First Embodiment 1.1 Structure of Nonvolatile Storage System

FIG. 1 is a schematic diagram showing the structure of a nonvolatile storage system 100 according to a first embodiment of the present invention.

As shown in FIG. 1, the nonvolatile storage system 100 includes an access device (access module) 1 and a nonvolatile storage device (nonvolatile storage module) 2. The access device 1 and the nonvolatile storage device 2 are connected to each other with an external bus B1, via which bidirectional data communication can be performed between the access device 1 and the nonvolatile storage device 2.

1.1.1 Structure of Access Device

As shown in FIG. 1, the access device 1 includes a use condition designation unit 11, a formatting unit 12, an R/W control unit 13, and a bus interface unit 14.

The use condition designation unit 11 sets a use condition based on, for example, input information from a user. More specifically, the use condition designation unit 11 sets, as the use condition, a temporary block number N_tmp indicating the number of temporary blocks to be prepared in a temporary area 23 of the nonvolatile storage device 2. The use condition designation unit 11 outputs the set use condition to the formatting unit 12.

The formatting unit 12 generates a memory area setting command to be transmitted to the nonvolatile storage device 2 based on the use condition set by the use condition designation unit 11. The formatting unit 12 outputs the generated memory area setting command to the bus interface unit 14, and executes control in a manner that the generated memory area setting command will be transmitted to the nonvolatile storage device 2 at a predetermined timing via the bus interface unit 14.

The memory area setting command may include, for example, the temporary block number N_tmp. The memory area setting command causes the nonvolatile storage device 2 to prepare a memory area (an area in the temporary area 23 and an area in a normal access area 24) as designated in the memory area setting command.

The formatting unit 12 generates a format command for logically formatting a normal access area of the nonvolatile memory 22 included in the nonvolatile storage device 2 that has been set using the memory area setting command, and transmits the format command to the nonvolatile storage device 2.

The R/W control unit 13 generates a read command for reading data from a predetermined area of the nonvolatile memory 22 of the nonvolatile storage device 2 and a write command for writing predetermined data into a predetermined area of the nonvolatile memory 22 of the nonvolatile storage device 2. The R/W control unit 13 outputs the generated command to the bus interface unit 14, and executes control in a manner that the generated command will be transmitted to the nonvolatile storage device 2 at a predetermined timing via the bus interface unit 14.

The bus interface unit 14 is connected to a host interface unit 211 included in the nonvolatile storage device 2 via the external bus B1, and functions as a communication interface between the access device 1 and the nonvolatile storage device 2. The bus interface unit 14 is further connected to the formatting unit 12 and the R/W control unit 13. Via the external bus B1, the bus interface unit 14 transmits a memory area setting command and a format command generated by the formatting unit 12 to the nonvolatile storage device 2 as controlled by the formatting unit 12. Via the external bus B1, the bus interface unit 14 further transmits a command generated by the R/W control unit 13 to the nonvolatile storage device 2 as controlled by the R/W control unit 13.

1.1.2 Structure of Nonvolatile Storage Device

As shown in FIG. 1, the nonvolatile storage device 2 includes a memory controller 21 and a nonvolatile memory 22. The memory controller 21 and the nonvolatile storage device 2 are connected to each other with a memory bus B2.

As shown in FIG. 1, the memory controller 21 includes a host interface unit 211, a use condition obtaining unit 212, a usable capacity determination unit 213, a memory interface unit 214, a usable capacity obtaining unit 215, a data read/write unit 216, and an address management unit 217.

The host interface unit 211 is connected to the bus interface unit 14 of the access device 1 via the external bus B1, and functions as a communication interface between the access device 1 and the nonvolatile storage device 2. The host interface unit 211 receives a memory area setting command transmitted from the access device 1 via the external bus B1, and outputs the received data (command) to the use condition obtaining unit 212. Also, the host interface unit 211 receives a format command, a read command, and a write command transmitted from the access device 1 via the external bus B1, and outputs the received data (commands) to the data read/write unit 216.

The use condition obtaining unit 212 extracts information associated with the use condition from data included in the memory area setting command received by the host interface unit 211. The information associated with the use condition may include, for example, the temporary block number N_tmp. The use condition obtaining unit 212 outputs the extracted information associated with the use condition to the usable capacity determination unit 213.

The usable capacity determination unit 213 determines a parameter for determining the capacity of the temporary area 23 and the capacity of the normal access area 24 in the nonvolatile memory 22 based on the information associated with the use condition that has been extracted by the use condition obtaining unit 212. When, for example, the information associated with the use condition indicates the temporary block number N_tmp, the usable capacity determination unit 213 determines a normal access block number N_normal, which indicates the number of physical blocks included in the normal access area 24, based on the total capacity of the nonvolatile memory and the temporary block number N_tmp. The usable capacity determination unit 213 then writes the determined temporary block number N_tmp and the determined normal access block number N_normal into a register area of the nonvolatile memory 22 via the memory interface unit 214, and determines the capacity (block number) of the temporary area 23 and the capacity (block number) of the normal access area 24 in the nonvolatile memory 22.

The memory interface unit 214 is connected to the nonvolatile memory 22 via the memory bus B2, and functions as a communication interface between the memory controller 21 and the nonvolatile memory 22. The memory interface unit 214 reads or writes predetermined data from a predetermined area of the nonvolatile memory as controlled by the usable capacity determination unit 213, the usable capacity obtaining unit 215, and the data read/write unit 216.

The usable capacity obtaining unit 215 receives information indicating whether the temporary area 23 and the normal access area 24 designated by the usable capacity determination unit 213 have been prepared successfully by the nonvolatile memory 22 via the memory interface unit 214, and determines whether the temporary area 23 and the normal access area 24 have been prepared successfully as designated by the usable capacity determination unit 213.

(1) When the temporary area 23 and the normal access area 24 have been prepared successfully as designated, the usable capacity obtaining unit 215 transmits information (response) indicating that the memory area setting of the nonvolatile memory 22 has been completed as designated by the formatting unit 12 to the access device 1 via the host interface unit 211 and the external bus B1.

(2) When the temporary area 23 and the normal access area 24 have not been prepared successfully as designated, the usable capacity obtaining unit 215 transmits error information (response) indicating that the memory area setting of the nonvolatile memory 22 has failed to be completed as designated by the formatting unit 12 to the access device 1 via the host interface unit 211 and the external bus B1.

The data read/write unit 216 is connected to the host interface unit 211, the memory interface unit 214, and the address management unit 217. The data read/write unit 216 mainly performs processes (1) to (4) below.

(1) Data Writing Process

Based on a write command transmitted from the access device 1, the data read/write unit 216 writes data designated by the write command at a physical address of the nonvolatile memory 1 corresponding to a logical address designated by the write command.

(2) Data Reading Process

Based on a read command transmitted from the access device 1, the data read/write unit 216 reads data designated by the read command from a physical address of the nonvolatile memory 1 corresponding to a logical address designated by the read command.

(3) Address Conversion Process

Based on a logical/physical address conversion table and a normal-access/temporary block management table that are managed by the address management unit 217, the data read/write unit 216 converts logical addresses used in the processes (1) and (2) to physical addresses.

(4) Logical Formatting of Normal Access Area 24 of Nonvolatile Memory 22

Based on a format command transmitted from the access device 1, the data read/write unit 216 logically formats the normal access area prepared in the nonvolatile memory 22. This process enables data stored in the nonvolatile memory 22 to be managed using a file system (a file allocation table (FAT) file system for example).

The address management unit 217 stores or holds the logical/physical address conversion table and the normal-access/temporary block management table. Based on the logical/physical address conversion table and the normal-access/temporary block management table, the address management unit 217 converts a logical address designated by the data read/write unit 216 to a physical address corresponding to the logical address, and outputs the physical address resulting from the conversion to the data read/write unit 216.

1.2 Operation of Nonvolatile Storage System

The operation of the nonvolatile storage system 100 with the above-described structure will now be described.

The operation performed when the nonvolatile storage system 100 records data corresponding to a single channel consisting of video data, audio data, and text data (single-channel recording) and the operation performed when the system records data corresponding to a plurality of channels (multi-channel recording) will now be described.

1.2.1 Single-Channel Recording

Figure 2:
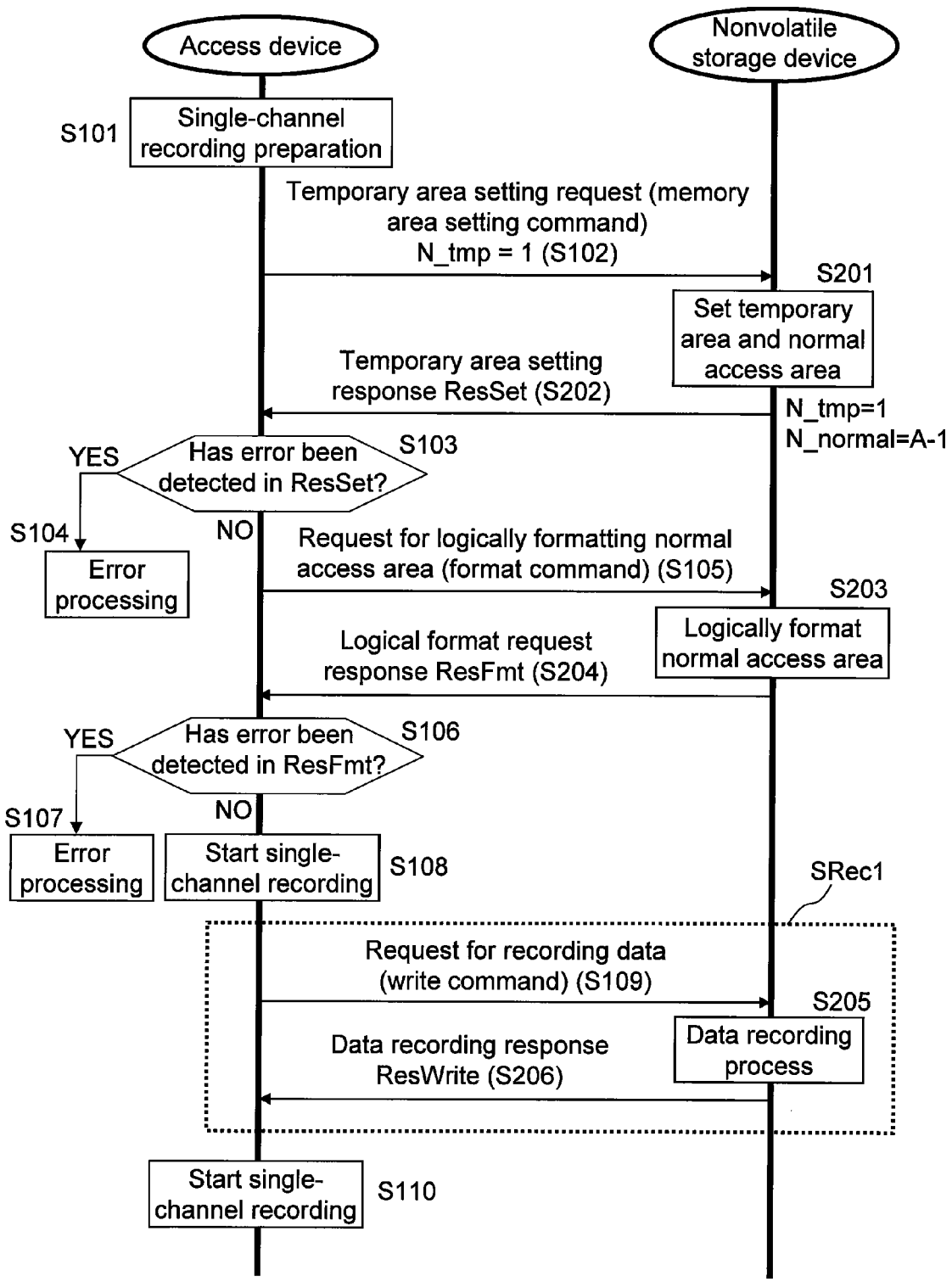
FIG. 2 shows a sequence of operation performed by an access device 1 and a nonvolatile storage device 2 for single-channel recording.

FIG. 2 shows a sequence of operation of the nonvolatile storage system 100 performed for single-channel recording. The single-channel recording operation of the nonvolatile storage system 100 will now be described with reference to the sequence shown in FIG. 2.

S101, S102

As shown in FIG. 2, the access device 1 starts a single-channel recording preparation process. More specifically, the formatting unit 12 determines the temporary block number N_tmp, which indicates the number of physical blocks of the temporary area 23, based on a use condition designated by the use condition designation unit 11 included in the access device 1. The formatting unit 12 then generates a memory area setting command including the determined temporary block number N_tmp. To perform single-channel recording in this example, the temporary block number N_tmp is set as N_tmp=1.

The formatting unit 12 then transmits the generated memory area setting command to the nonvolatile storage device 2 via the bus interface unit 14 and the external bus B1 (S102).

S201:

The nonvolatile storage device 2 receives the memory area setting command transmitted from the access device 1 via the host interface unit 211. The use condition obtaining unit 212 included in the nonvolatile storage device 2 then extracts the temporary block number N_tmp (=1) of the temporary area 23 from the memory area setting command, and outputs the extracted temporary block number N_tmp to the usable capacity determination unit 213.

The usable capacity determination unit 213 determines the normal access block number N_normal, which indicates the number of physical blocks of the normal access area 24, based on the temporary block number N_tmp. For single-channel recording, N_tmp=1, and N_normal=A−1 where A is a total number of physical blocks that can be used as a data area included in the nonvolatile memory 22.

The usable capacity determination unit 213 then writes the temporary block number and the normal access block number into a register area of the nonvolatile memory 22 via the memory interface unit 214 and the memory bus B2 to determine the capacity (block number) of the temporary area 23 of the nonvolatile memory 22 and the capacity (block number) of the normal access area 24 of the nonvolatile memory 22.

S202:

The usable capacity obtaining unit 215 receives, from the nonvolatile memory 22, information indicating whether the N_tmp (=1) physical block has been successfully prepared in the temporary area 23 (whether temporary block preparation has been successful) and the N_normal (=A−1) physical block(s) have been successfully prepared in the normal access area 24 (whether normal access block preparation has been successful).

(1) When the temporary area 23 and the normal access area 24 have been successfully prepared as designated, the usable capacity obtaining unit 215 transmits a response ResSet including information indicating that the memory area setting of the nonvolatile memory 22 has been completed as designated by the formatting unit 12 to the access device 1 via the host interface unit 211 and the external bus B1.

(2) When the temporary area 23 and the normal access area 24 have not been successfully prepared as designated, the usable capacity obtaining unit 215 transmits a response ResSet including error information indicating that the memory area setting of the nonvolatile memory 22 has failed to be completed as designated by the formatting unit 12 to the access device 1 via the host interface unit 211 and the external bus B1.

S103 to S105:

The access device 1 analyzes the response ResSet transmitted from the nonvolatile storage device 2 (S103). When detecting error information indicating that the memory area setting of the nonvolatile memory 22 has failed to be completed as designated by the formatting unit 12, the access device 1 performs error processing (S104).

When the access device 1 analyzes the response ResSet transmitted from the nonvolatile storage device 2 and detects information indicating that the memory area setting of the nonvolatile memory 22 has been completed as designated by the formatting unit 12, the access device 1 generates a format command for logically formatting the normal access area 24 and transmits the format command to the nonvolatile storage device 2 (S105).

S203, S204:

The data read/write unit 216 included in the nonvolatile storage device 2 receives the format command transmitted from the access device 1 via the host interface unit 211. The data read/write unit 216 logically formats the normal access area 24 of the nonvolatile memory 22 via the host interface unit 211 (S203). This process enables data stored in the nonvolatile memory 22 to be managed using a file system (a FAT file system for example).

When the normal access area 24 is logically formatted successfully as designated, information indicating that the logical formatting of the normal access area 24 has been completed successfully is output from the nonvolatile memory 22 to the usable capacity obtaining unit 215. The usable capacity obtaining unit 215 then outputs a response ResFmt including information indicating that the logical formatting of the normal access area 24 has been completed successfully to the access device 1 via the host interface unit 211 (S204).

When the logical formatting of the normal access area 24 has failed to be completed successfully, error information indicating that the logical formatting of the normal access area 24 has failed to be completed successfully is output from the nonvolatile memory 22 to the usable capacity obtaining unit 215. The usable capacity obtaining unit 215 then outputs a response ResFmt including error information indicating that the logical formatting of the normal access area 24 has failed to be completed successfully to the access device 1 via the host interface unit 211 (S204).

S106 to S108:

The access device 1 analyzes the response ResFmt transmitted from the nonvolatile storage device 2 (S106). When detecting error information indicating that the logical formatting of the normal access area 24 has failed to be completed, the access device 1 performs error processing (S107).

When the access device 1 analyzes the response ResFmt transmitted from the nonvolatile storage device 2 (S106) and detects information indicating that the logical formatting of the normal access area 24 has been completed successfully, the access device 1 starts single-channel recording (S108).

S109:

The R/W control unit 13 included in the access device 1 generates a write command for recording single-channel data to the nonvolatile memory 22, and transmits the generated write command to the nonvolatile storage device 2.

S205, S206:

The data read/write unit 216 included in the nonvolatile storage device 2 receives the write command transmitted from the access device 1 via the host interface unit 211. From the received write command, the data read/write unit 216 extracts data to be written to the nonvolatile memory 22 and a logical address LA indicating an area into which the data is to be written.

The data read/write unit 216 converts a logical address LA to a physical address PA based on the logical/physical address conversion table and the normal-access/temporary block management table that are managed by the address management unit 217.

The data read/write unit 216 writes the data transmitted using the write command into an area corresponding to the physical address PA in the nonvolatile memory 22 via the memory interface unit 214 and the memory bus B2 (S205). The data writing process will be described in detail later.

The nonvolatile storage device 2 generates a response ResWrite including information indicating whether the data writing process caused by the write command has been completed successfully, and transmits the response ResWrite to the access device 1 (S206). The processing in step S206 may not be performed.

SRec1:

In the nonvolatile storage system 100, the processing in steps S109, S205, and S206 is performed repeatedly until record-target data is recorded completely onto the nonvolatile memory 22 included in the nonvolatile storage device 2.

S110:

The access device 1 completes the single-channel recording when determining that the entire record-target data has been recorded onto the nonvolatile memory 22 included in the nonvolatile storage device 2.

This completes the single-channel recording performed by the nonvolatile storage system 100.

1.2.2 Multi-Channel Recording

The multi-channel recording performed by the nonvolatile storage system 100 will now be described.

Figure 3:
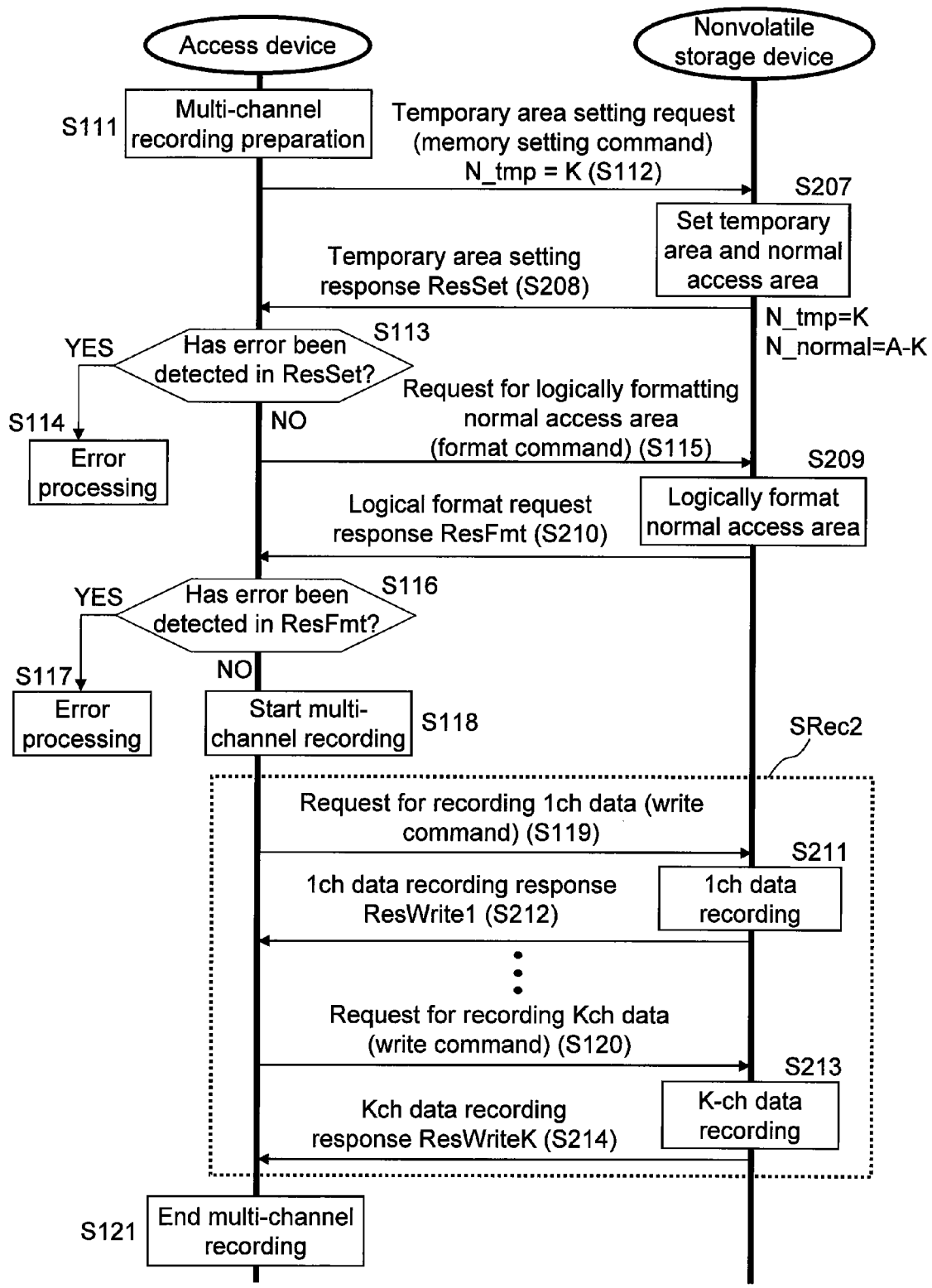
FIG. 3 shows a sequence of operation performed by the access device 1 and the nonvolatile storage device 2 for multi-channel recording.

FIG. 3 shows a sequence of operation of the nonvolatile storage system 100 performed for multi-channel recording. The multi-channel recording operation of the nonvolatile storage system 100 will now be described with reference to the sequence shown in FIG. 3.

S111, S112

As shown in FIG. 3, the access device 1 starts a multi-channel recording preparation process. More specifically, the formatting unit 12 determines the temporary block number N_tmp, which indicates the number of physical blocks of the temporary area 23, based on a use condition designated by the use condition designation unit 11 included in the access device 1. The formatting unit 12 then generates a memory area setting command including the determined temporary block number N_tmp. To perform multi-channel recording in this example, the temporary block number N_tmp is set as N_tmp=K (K is an integer satisfying K>1).

The formatting unit 12 then transmits the generated memory area setting command to the nonvolatile storage device 2 via the bus interface unit 14 and the external bus B1 (S112).

S207:

The nonvolatile storage device 2 receives the memory area setting command transmitted from the access device 1 via the host interface unit 211. The use condition obtaining unit 212 included in the nonvolatile storage device 2 then extracts the temporary block number N_tmp (=K) of the temporary area 23 from the memory area setting command, and outputs the extracted temporary block number N_tmp to the usable capacity determination unit 213.

The usable capacity determination unit 213 determines the normal access block number N_normal, which indicates the number of physical blocks of the normal access area 24, based on the temporary block number N_tmp. For multi-channel recording shown in FIG. 2, N_tmp=K, and N_normal=A−K where A is a total number of physical blocks that can be used as a data area included in the nonvolatile memory 22.

The usable capacity determination unit 213 then writes the temporary block number and the normal access block number into a register area of the nonvolatile memory 22 via the memory interface unit 214 and the memory bus B2 to determine the capacity (block number) of the temporary area 23 of the nonvolatile memory 22 and the capacity (block number) of the normal access area 24 of the nonvolatile memory 22.

This process enables temporary blocks corresponding in one-to-one to the number of channels (K channels) to be prepared in the nonvolatile storage device 2.

S208:

The usable capacity obtaining unit 215 receives, from the nonvolatile memory 22, information indicating whether the N_tmp (=K) physical blocks have been successfully prepared in the temporary area 23 (whether temporary block preparation has been successful) and the N_normal (=A−K) physical blocks have been successfully prepared in the normal access area 24 (whether normal access block preparation has been successful).

(1) When the temporary area 23 and the normal access area 24 have been successfully prepared as designated, the usable capacity obtaining unit 215 transmits a response ResSet including information indicating that the memory area setting of the nonvolatile memory 22 has been completed as designated by the formatting unit 12 to the access device 1 via the host interface unit 211 and the external bus B1.

(2) When the temporary area 23 and the normal access area 24 have not been successfully prepared as designated, the usable capacity obtaining unit 215 transmits a response ResSet including error information indicating that the memory area setting of the nonvolatile memory 22 has failed to be completed as designated by the formatting unit 12 to the access device 1 via the host interface unit 211 and the external bus B1.

S113 to S115:

The access device 1 analyzes the response ResSet transmitted from the nonvolatile storage device 2 (S113). When detecting error information indicating that the memory area setting of the nonvolatile memory 22 has failed to be completed as designated by the formatting unit 12, the access device 1 performs error processing (S114).

When the access device 1 analyzes the response ResSet transmitted from the nonvolatile storage device 2 and detects information indicating that the memory area setting of the nonvolatile memory 22 has been completed as designated by the formatting unit 12, the formatting unit 12 generates a format command for logically formatting the normal access area 24 and transmits the format command to the nonvolatile storage device 2 (S115).

S209, S210:

The data read/write unit 216 included in the nonvolatile storage device 2 receives the format command transmitted from the access device 1 via the host interface unit 211. The data read/write unit 216 logically formats the normal access area 24 of the nonvolatile memory 22 via the host interface unit 211 (S209).

When the normal access area 24 is logically formatted successfully as designated, information indicating that the logical formatting of the normal access area 24 has been completed successfully is output from the nonvolatile memory 22 to the usable capacity obtaining unit 215. The usable capacity obtaining unit 215 then outputs a response ResFmt including information indicating that the logical formatting of the normal access area 24 has been completed successfully to the access device 1 via the host interface unit 211 (S210).

When the logical formatting of the normal access area 24 has failed to be completed successfully, error information indicating that the logical formatting of the normal access area 24 has failed to be completed successfully is output from the nonvolatile memory 22 to the usable capacity obtaining unit 215. The usable capacity obtaining unit 215 then outputs a response ResFmt including error information indicating that the logical formatting of the normal access area 24 has failed to be completed successfully to the access device 1 via the host interface unit 211 (S210).

S116 to S118:

The access device 1 analyzes the response ResFmt transmitted from the nonvolatile storage device 2 (S116). When detecting error information indicating that the logical formatting of the normal access area 24 has failed to be completed, the access device 1 performs error processing (S117).

When the access device 1 analyzes the response ResFmt transmitted from the nonvolatile storage device 2 (S116) and detects information indicating that the logical formatting of the normal access area 24 has been completed successfully, the access device 1 starts multi-channel recording (S118).

S119:

The R/W control unit 13 included in the access device 1 generates a write command for recording 1 ch data (1st-channel data), which is data corresponding to one of a plurality of channels to which multi-channel data corresponds, onto the nonvolatile memory 22. The R/W control unit 13 then transmits the generated write command to the nonvolatile storage device 2.

S211, S212:

The data read/write unit 216 included in the nonvolatile storage device 2 receives the write command transmitted from the access device 1 via the host interface unit 211. From the received write command, the data read/write unit 216 extracts data to be written to the nonvolatile memory 22 and a logical address LA indicating an area into which the data is to be written.

The data read/write unit 216 converts the logical address LA to a physical address PA based on the logical/physical address conversion table and the normal-access/temporary block management table that are managed by the address management unit 217.

The data read/write unit 216 writes the data transmitted using the write command into an area corresponding to the physical address PA in the nonvolatile memory 22 via the memory interface unit 214 and the memory bus B2 (S211). The data writing process will be described in detail later.

The nonvolatile storage device 2 generates a response ResWrite including information indicating whether the data writing process caused by the write command has been completed successfully, and transmits the response ResWrite to the access device 1 (S212). The processing in step S212 may not be performed.

S120, S213, S214:

Data corresponding to each channel of the record-target channels (K channels in this example) is subjected to the processing in steps S113, S207, and S208.

SRec2:

With the nonvolatile storage system 100, the processing in steps S119 to S214 (processing SRec2 in FIG. 3) is performed repeatedly until record-target multi-channel data is recorded completely onto the nonvolatile memory 22 included in the nonvolatile storage device 2. The temporary blocks corresponding in one-to-one to the number of channels to be recorded (K channels) are prepared in the nonvolatile storage device 2. The data recording process is performed using one temporary block for data of each channel. This structure of the nonvolatile storage system 100 reduces the need for the saving process (data integration process). As a result, the nonvolatile storage system 100 easily guarantees a minimum recording speed for multi-channel recording.

S121:

The access device 1 completes the multi-channel recording when determining that the entire record-target data (multi-channel data) has been recorded onto the nonvolatile memory 22 included in the nonvolatile storage device 2.

This completes the multi-channel recording performed by the nonvolatile storage system 100.

1.2.3 Address Management Unit

The logical/physical address conversion table and the normal-access/temporary block management table that are managed by the address management unit 217 will now be described.

1.2.3.1 Logical/Physical Address Conversion Table

The logical/physical address conversion table managed by the address management unit 217 stores the correspondence between logical block addresses and physical block addresses.

FIG. 4A shows an example of a part of the logical/physical address conversion table used for single-channel recording in the nonvolatile storage system 100.

FIG. 5A shows an example of a part of the logical/physical address conversion table used for multi-channel recording in the nonvolatile storage system 100.

The access device 1 manages data using a logical address space. The logical block addresses shown in FIGS. 4A and 5A are logical addresses of logical blocks defined in the logical address space managed by the access device 1. The nonvolatile storage device 2 manages data using a physical address space. The physical block addresses shown in FIGS. 4A and 5A are physical addresses of physical blocks defined in the physical address space managed by the nonvolatile storage device 2.

The address space managed by the access device 1 differs from the address space managed by the nonvolatile storage device 2. The address conversion performed by the address management unit 217 included in the nonvolatile storage device 2 enables random address conversion to be performed in the data management. In other words, the address conversion performed in the nonvolatile storage device 2 enables a logical block managed by the access device 1 to be allocated randomly to a physical block that is managed by the nonvolatile storage device 2. In the example shown in FIG. 4A,s a logical block with a logical block address of 0x00A0 is not constantly allocated to a physical block with a logical block address of 0x0010, but can be allocated to a physical block with an address other than the physical block address of 0x0010.

This method enables the access device 1 to manage data using logical addresses without being required to determine the physical addresses defined for the nonvolatile memory 22.

The logical/physical address conversion table may not include information indicating the channel number shown in the leftmost column in FIGS. 4A and 5B.

For ease of explanation, a physical address and a logical address are assumed to be two-byte (16-bit) addresses. The higher-order 12 bits of the physical address indicate the physical block address, and the lower-order four bits of the physical address indicate the page number. The higher-order 12 bits of the logical address indicate the logical block address, and the lower-order four bits of the logical address indicate the page number. The logical block address and the physical block address are expressed using hexadecimal numbers whose lower-order four bits are zeros. For example, a physical block (physical block consisting of five pages) shown on the left in FIG. 6A has a physical block address of 0x0010 commonly for physical addresses 0x0010 to 0x0014.

In the present embodiment, the page number in the logical block is the same as the page number in the corresponding physical block. For example, a logical address 0x00A2 is converted to a physical address 0x0012 using the logical/physical address conversion table shown in FIG. 4A (the page numbers are the same in the logical block and in the physical block). The logical addresses, physical addresses, logical block addresses, and physical block addresses may be expressed using other address systems. Further, the relationship between the blocks and the pages (for example, the number of pages included in a single physical block) should not be limited to the relationship described in the above example.

1.2.3.2 Normal-Access/Temporary Block Management Table

The normal-access/temporary block management table managed by the address management unit 217 stores the correspondence between normal access block addresses and temporary block addresses.

FIG. 4B shows an example of the normal-access/temporary block management table used for single-channel recording in the nonvolatile storage system 100. FIG. 5B shows an example of the normal-access/temporary block management table used for multi-channel recording (the channel number K=4) in the nonvolatile storage system 100. The normal access blocks are physical blocks prepared in the normal access area 24 of the nonvolatile memory 22. As shown in FIGS. 4B and 5B, the physical block addresses included in the logical/physical address conversion table are the same as the physical block addresses of the normal access blocks.

The address management unit 217 stores the correspondence between normal access blocks and temporary blocks corresponding in one-to-one to the record-target channel(s). For single-channel recording, the address management unit 217 stores the correspondence between a normal access block and a temporary block corresponding to a single channel as shown in FIG. 4B. For multi-channel recording, the address management unit 217 stores the correspondence between normal access blocks and temporary blocks corresponding to K channels (K=4 in the example shown in FIG. 5B) as shown in FIG. 5B.

1.2.4 Data Writing Process

The data writing process performed by the nonvolatile storage system 100 will now be described.

The saving process (data integration process) will first be described with reference to FIGS. 6A to 6C.

1.2.4.1 Saving Process (Data Integration Process)

Figure 6:
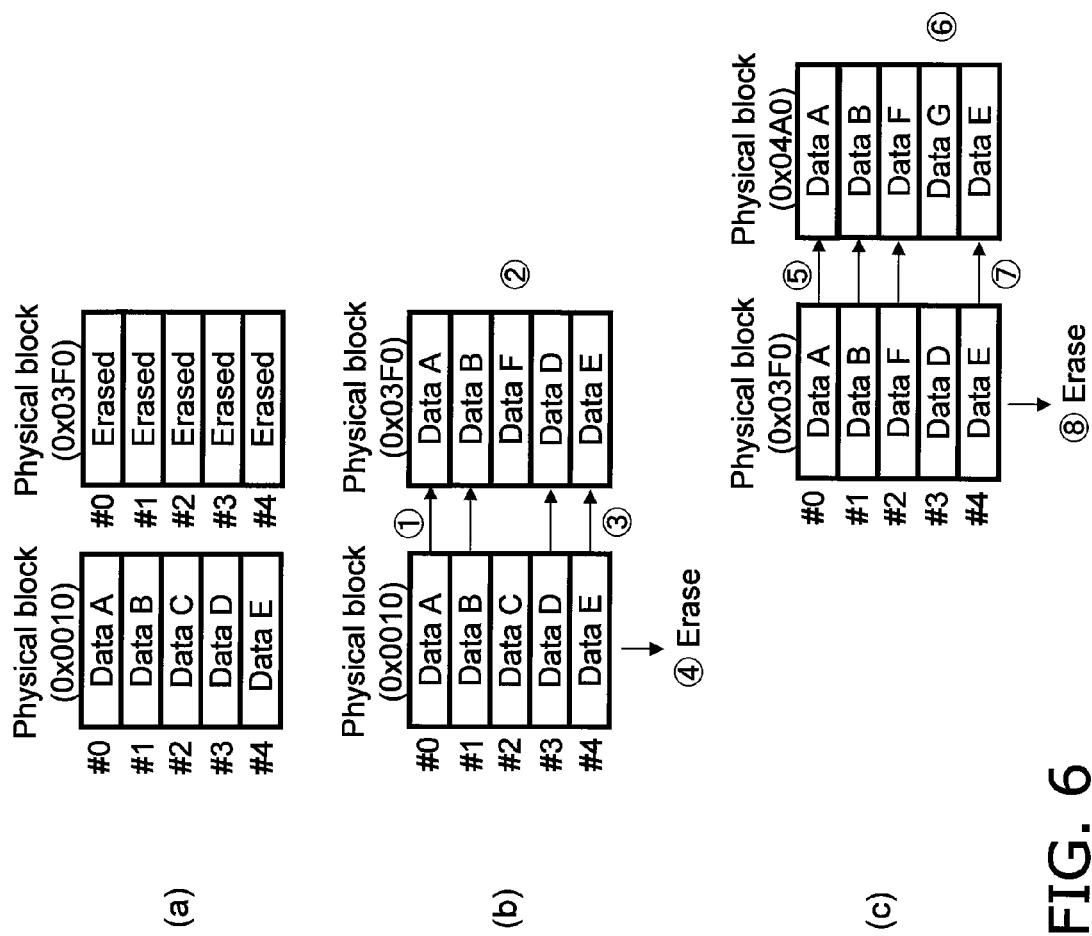
FIGS. 6A to 6C describe a saving process (data integration process).

FIGS. 6A to 6C describe the saving process (data integration process).

In the example shown in FIGS. 6A to 6C, the physical block 0x0010 stores data pieces A to E, which are valid data pieces. In this physical block, the data piece C is updated to the data piece F, and the data piece D is updated to the data piece G. The saving process required in this case will now be described.

The nonvolatile memory, which does not allow data to be updated in units of pages, first requires data to be erased in units of physical blocks, and then requires valid data to be copied, and then new data to be written. In detail, an erased block (unoccupied block) in which data has been erased from all of its pages, or the block 0x03F0 in this example, is first prepared as shown in FIG. 6A.

As shown in FIG. 6B, the data piece A and the data piece B stored in the physical block 0x0010 are copied into page 0 and page 1 of the physical block 0x03F0 (step 1). Circled numbers in FIGS. 6A and 6B hereafter indicate the step numbers of steps X (X is an integer).

Subsequently, the data piece F is written into page 2 of the physical block 0x03F0 (step 2). Further, the data piece D and the data piece E stored in pages 3 and 4 of the physical block 0x0010 are then copied into pages 3 and 4 of the physical block 0x03F0 (step 3).

In this manner, all the valid data pieces are relocated from the physical block 0x0010 to the physical block 0x03F0. After this, the physical block 0x0010 is erased (step 4).

To update the data piece D to the data piece G, a new erased block (unused block) 0x04A0 is prepared.

The data pieces A, B, and F, which are stored in pages 0 to 2 of the physical block 0x03F0, are then copied into pages 0 to 2 of the physical block 0x04A0 (step 5).

The data piece G is then written into page 3 of the physical block 0x04A0 (step 6). The data piece E stored in page 4 of the physical block 0x03F0 is then copied into page 4 of the physical block 0x04A0 (step 7).

In this manner, all the valid data pieces are relocated from the physical block 0x03F0 to the physical block 0x04A0. After this, the physical block 0x03F0 is erased (step 8).

When different data pieces stored in the same physical block are updated, the need for the saving process increases (the physical block erasing process needs to be performed twice in the example shown in FIGS. 6A to 6C). The physical block erasing process requires a long time, and lowers the speed of data writing to the nonvolatile memory.

1.2.4.2 Data Writing Process Performed by Nonvolatile Storage System 100

The data writing process performed by the nonvolatile storage system 100 will now be described with reference to FIGS. 7A to 7C and 8A and 8B.

Figure 7:
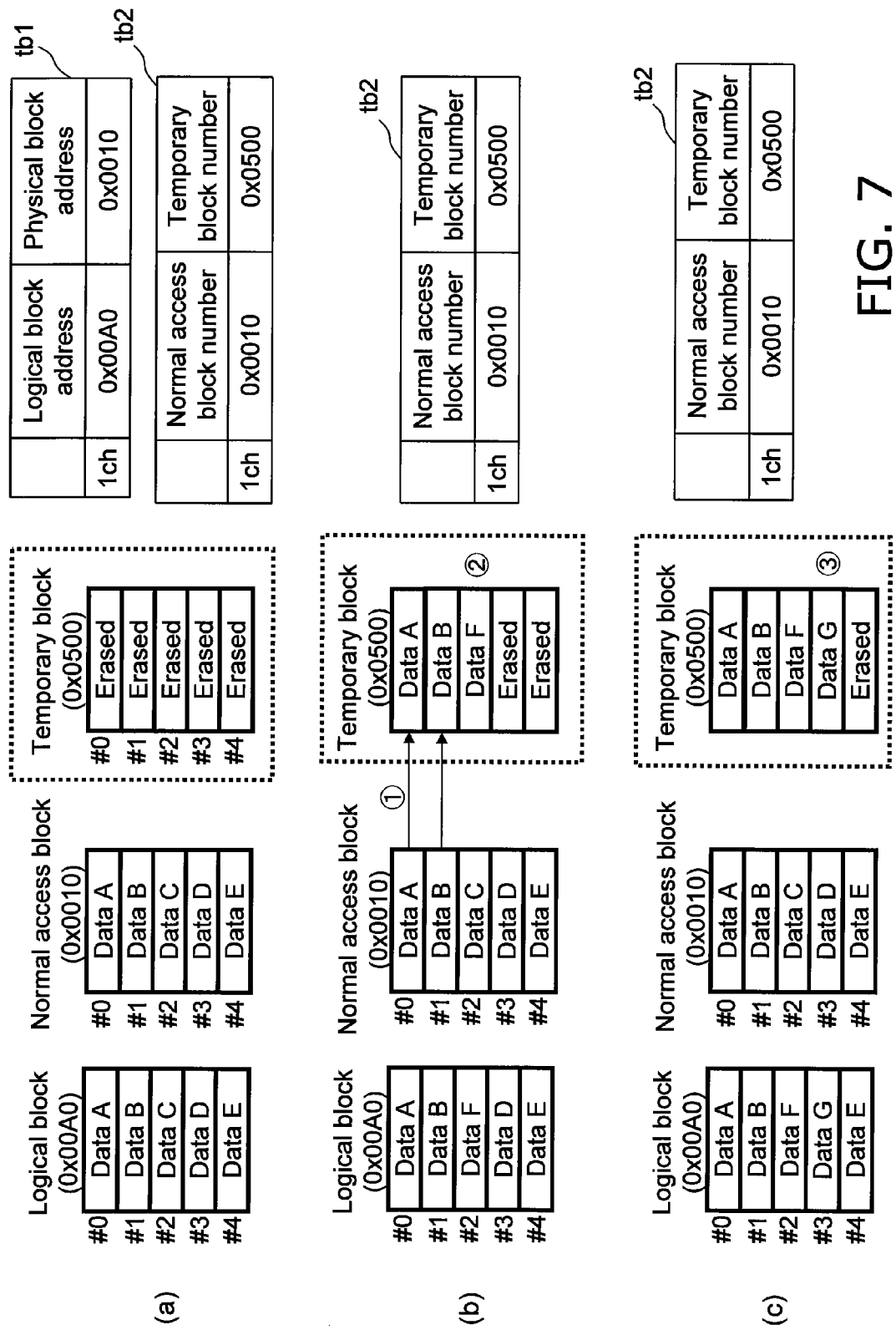
FIGS. 7A to 7C describe a data writing process performed by the nonvolatile storage system 100.

FIGS. 7A to 7C schematically show the state of normal access blocks and temporary access blocks when a data piece C with a logical address of 0x00A2 is updated to a data piece F and a data piece D with a logical address of 0x00A3 is updated to a data piece G in the nonvolatile storage system 100. The logical blocks shown in FIGS. 7A to 7C are used as the units in which the access device 1 manages data. In other words, the logical blocks shown in FIGS. 7A to 7C are blocks that are managed using logical addresses in the logical address space managed by the access device 1. The normal access blocks shown in FIGS. 7A to 7C are used as the units in which the nonvolatile storage device 2 manages data. In other words, the normal access blocks shown in FIGS. 7A to 7C are blocks that are managed using physical addresses in the physical address space managed by the nonvolatile storage device 2. The normal access blocks are physical blocks that are prepared in the normal access area of the nonvolatile storage device 2.

The processing performed when the data piece C with the logical address of 0x00A2 is updated to the data piece F and the data piece D with the logical address of 0x00A3 is updated to the data piece G in the nonvolatile storage system 100 will now be described with reference to FIGS. 7A to 7C.

State Shown in FIG. 7A:

A write command for updating the data piece C with the logical address of 0x00A2 to the data piece F is transmitted.

The data read/write unit 216 extracts the logical block address 0x00A0 of the rewrite-target data from the received write command, and outputs the extracted logical block address to the address management unit 217.

The address management unit 217 refers to the logical/physical address conversion table tb1, and detects that a logical block with the logical block address of 0x00A0 corresponds to a physical block address of 0x0010. The address management unit 217 refers to the normal-access/temporary block management table tb2, and detects that a temporary block corresponding to a normal access block with the physical block address of 0x0010 corresponds to a physical block address of 0x0500. The address management unit 217 then outputs the detection results to the data read/write unit 216.

Based on the detection results output from the address management unit 217, the data read/write unit 216 detects, in the state shown in FIG. 7A, that the normal access block with the physical block address of 0x0010 stores data pieces A to E, which are valid data pieces. Information indicating the status of each page of the physical block (valid, invalid, or unoccupied (erased)) may be stored in a redundant part included in a page of each block, or may be managed using a predetermined area of each block. Alternatively, a predetermined physical block of the nonvolatile memory 22 may be used as a management block for such information, and such information may be managed using the predetermined physical block.

In the state shown in FIG. 7A, the data read/write unit 216 determines that the valid data pieces A to E have been written in pages 0 to 4 of the normal access block with the physical block address of 0x0010, and the temporary block with the physical block address of 0x0500 is an erased block (unoccupied block).

State Shown in FIG. 7B:

The data read/write unit 216 then copies the data pieces A and B stored in pages 0 and 1 of the normal access block (physical block address: 0x0010) into pages 0 and 1 of the temporary block (physical block address: 0x0500). The data read/write unit 216 changes the status of pages 0 and 1 of the normal access block (physical block address: 0x0010) from valid to invalid, and changes the status of pages 0 and 1 of the temporary block (physical block address: 0x0500) from unoccupied to valid (step 1).

The data read/write unit 216 writes the data piece F into page 2 of the temporary block (physical block address: 0x0500), and changes the status of page 2 of the normal access block (physical block address: 0x0010) from valid to invalid, and changes the status of page 2 of the temporary block (physical block address: 0x0500) from unoccupied to valid (step 2).

In this state, the data piece C has been updated to the data piece F.

State Shown in FIG. 7C:

The data read/write unit 216 writes the data piece G into page 3 of the temporary block (physical block address: 0x0500), and changes the status of page 3 of the normal access block (physical block address: 0x0010) from valid to invalid and changes the status of page 3 of the temporary block (physical block address: 0x0500) from unoccupied to valid (step 3).

In this state, the data piece D has been updated to the data piece G.

Unlike in the example described with reference to FIGS. 6A to 6C, the physical block erasing process is eliminated in the above example in which the data piece C is updated to the data piece F and the data piece D is updated to the data piece G.

In this manner, the use of temporary blocks in the nonvolatile storage system 100 reduces the need for the saving process (data integration process).

The processing performed when the data piece E is further updated to the data piece H in the state shown in FIG. 7C will now be described with reference to FIGS. 8A and 8B. State Shown in FIG. 8A:

The data read/write unit 216 writes the data piece H into page 4 of the temporary block (physical block address: 0x0500), and changes the status of page 4 of the normal access block (physical block address: 0x0010) from valid to invalid and changes the status of page 4 of the temporary block (physical block address: 0x0500) from unoccupied to valid (step 4).

In this state, the normal access block and the temporary block include no unoccupied page. In this case, the normal access block (physical block address: 0x0010) is subjected to erasure processing. This changes the temporary block (physical block address: 0x0500) to a normal access block.

Figure 8:
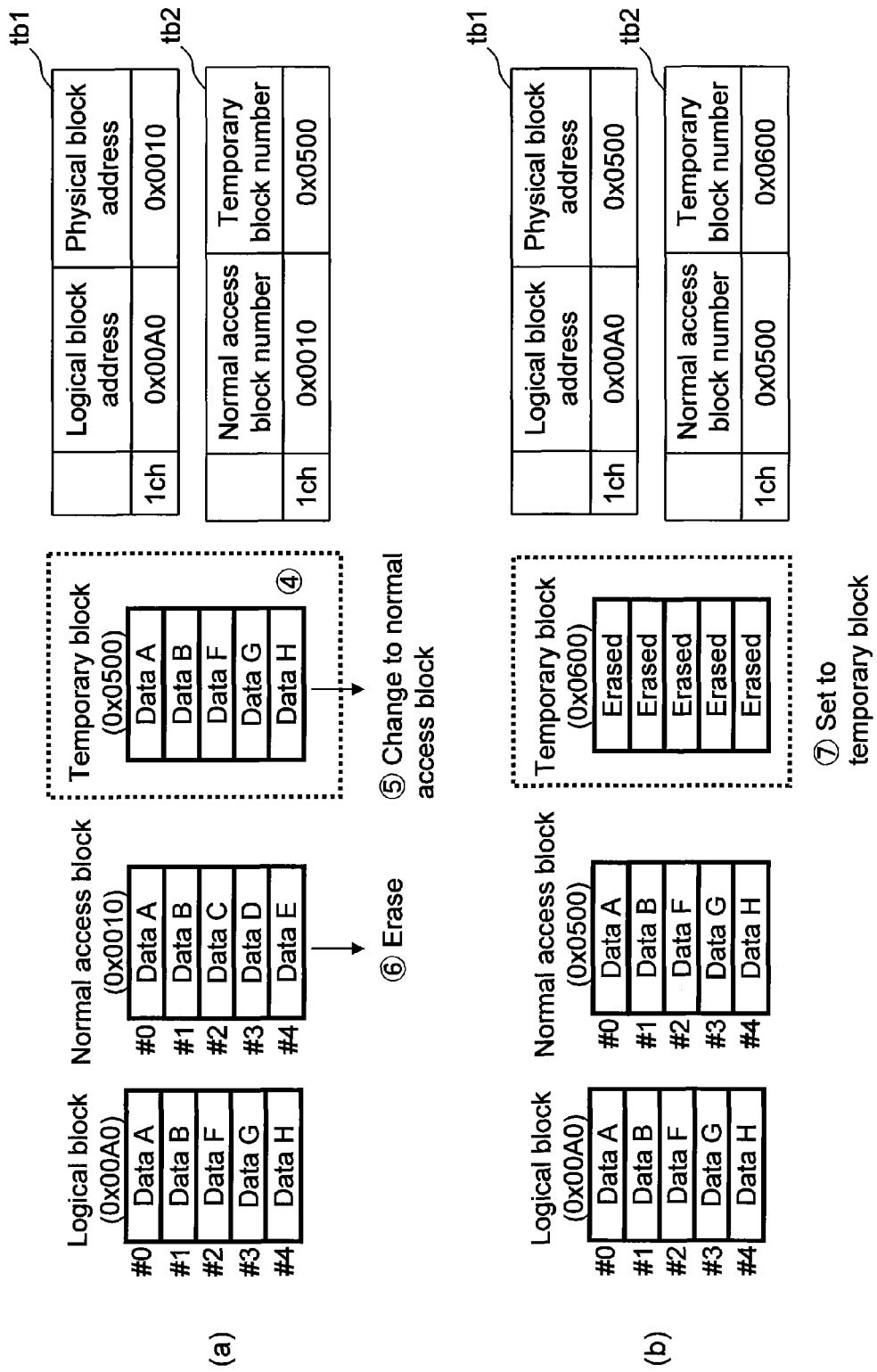
FIGS. 8A and 8B describe the data writing process performed by the nonvolatile storage system 100.

State Shown in FIG. 8B

The data read/write unit 216 sets an unoccupied block (a physical block with a physical block address of 0x0600 in the example shown in FIG. 8B) to a new temporary block.

The address management unit 217 updates the logical/physical address conversion table and the normal-access/temporary block management table to reflect the relationship between the normal access block and the temporary block that has been changed to the state shown in FIG. 8B.

As a result, the nonvolatile storage system 100 enables a temporary blocks to be prepared after the physical block erasing process is performed.

The data writing process described above is performed when the nonvolatile storage system 100 performs single-channel recording. As a result, the nonvolatile storage system 100 minimizes the temporary area as required, and maximizes the normal access area when performing single-channel recording.

The process described above is repeated the number of times equal to the number of channels when the nonvolatile storage system 100 performs multi-channel recording. When, for example, the nonvolatile storage system 100 performs recording for K channels, K temporary blocks are prepared, for each of which the above process is performed repeatedly. As a result, the nonvolatile storage system 100 reduces the need for the saving process (data integration process) when performing multi-channel recording, and prevents the writing speed from decreasing. The nonvolatile storage system 100 easily guarantees a minimum recording speed.

More specifically, the nonvolatile storage system 100 changes the temporary area 23 and the normal access area in a different manner depending on whether it performs single-channel recording or multi-channel recording, and optimizes the processing speed (in particular the speed at which the data writing process is performed) and the usable capacity of memory.

Although the present embodiment describes the case in which the storage architecture of the nonvolatile storage system 100 is changed when the system performs single-channel recording and multi-channel recording, the present invention should not be limited to this structure. For example, the storage architecture of the nonvolatile storage system 100 may be changed in accordance with an application used in the nonvolatile storage system 100.

In other words, when intended use of the nonvolatile storage system 100 is changed, the nonvolatile storage system 100 can flexibly change the storage architecture accordingly. In detail, the nonvolatile storage system 100 can flexibly change the settings of the temporary area 23 and the normal access area 24 accordingly. As a result, the nonvolatile storage system 100 optimizes processing in accordance with its intended use.

The nonvolatile storage system 100 performs the processing described below for reading data that has been written using temporary blocks.

The R/W control unit included in the access device 1 generates a read command, and transmits the read command from the access device 1 to the nonvolatile storage device 2 via the bus interface unit 14.

The data read/write unit 216 extracts a logical address of the read-target data from the transmitted read command.

The address management unit 217 detects a physical block address of a temporary block storing data (valid data) having the extracted logical address and a physical block address of a normal access block having the extracted logical address using the logical/physical address conversion table and the normal-access/temporary block management table, and outputs the detected physical block addresses to the data read/write unit 216.

The data read/write unit 216 determines a physical address at which the valid data has been stored based on the physical block addresses of the temporary block and the normal access block detected by the address management unit 217, and reads data from the determined physical address.

To read data with the logical address of 0x00A2 in the state shown in FIG. 7B, the data read/write unit 216 first determines that the data with the logical address of 0x00A2 is stored in a normal access block (physical block address: 0x0010) or in a temporary block (physical block address: 0x0500) using the logical/physical address conversion table and the normal-access/temporary block management table. The data read/write unit 216 determines the status of the pages included in the normal access block and the temporary block, and detects that the data piece stored in page 2 of the temporary block (physical block address: 0x0500) is valid and the data piece stored in page 2 of the normal access block (physical block address: 0x0010) is invalid. In this case, the data read/write unit 216 determines that the data piece stored in page 2 of the temporary block (physical block address: 0x0500) is target data to be read, and reads the data (data piece F) stored in page 2 of the temporary block (physical block address: 0x0500).

Other Embodiments

Although the above embodiment describes the case in which the memory area setting command generated by the formatting unit 12 includes the temporary block number N_tmp of the temporary area 23, the present invention should not be limited to this structure. For example, the following modifications are possible.

As shown in FIGS. 9A and 9B, a multi-channel flag may be set to indicate whether recording to be performed is multi-channel recording. The multi-channel flag set at 0 indicates that the recording to be performed is single-channel recording. The multi-channel recording flag set at 1 indicates that the recording to be performed is multi-channel recording.

When single-channel recording is to be performed, the multi-cannel flag is followed by information indicating a minimum bandwidth to be used as shown in FIG. 9A.

When multi-channel recording is to be performed, as shown in FIG. 9B, the multi-channel flag is followed by an area indicating the number of channels N, and further followed by areas each indicating a minimum bandwidth to be used for each of the N channels, that is, a minimum bandwidth to be used for the first channel, a minimum bandwidth to be used for the second channel, . . . to a minimum bandwidth to be used for the N-th channel.

The nonvolatile storage device 2 receives this memory area setting command. For single-channel recording, the nonvolatile storage device 2 sets the temporary area 23 and the normal access area 24 of the nonvolatile memory 22 in a manner to achieve a minimum used bandwidth designated by the memory area setting command (for example, a minimum used bandwidth may be designated as 4 [Mbps] when single-channel data for standard-definition television (SDTV) is recorded, and a minimum used bandwidth may be designated as 10 [Mbps] when single-channel data for high-definition television (HDTV) is recorded).

For multi-channel recording, the nonvolatile storage device 2 receives the memory area setting command including the areas shown in FIG. 9B, and sets the temporary area 23 and the normal access area 24 of the nonvolatile memory 22 in a manner to achieve a minimum used bandwidth for each of the first to N-th channels based on information included in the received memory area setting command.

Although the above embodiment describes the case in which a single temporary block is set for each of the plurality of channels for which multi-channel recording is performed, the present invention should not be limited to this structure. For example, int (K/2) temporary blocks may be set for each of the K channels for which multi-channel recording is performed. In this case, int (X) is a maximum integer not exceeding X.

In particular, the nonvolatile storage system 100 sets a minimum number of temporary blocks with which a minimum used bandwidth can be achieved. This maximizes the use of the normal access area.

Alternatively, the memory area setting command may be set to indicate a class, and the temporary area 23 and the normal access area 24 of the nonvolatile storage device 2 in the nonvolatile storage system 100 may be set to satisfy the conditions of the designated class. For example, the memory area setting command may indicate one of four classes 1 to 4, and may designate (1) a minimum used bandwidth x1 for class 1,
(2) a minimum used bandwidth x2 (x2>x1) for class 2,
(3) a minimum used bandwidth x3 (x3>x2) for class 3, and
(4) a minimum used bandwidth x4 (x4>x3) for class 4.

The nonvolatile storage device 2 may then set its temporary area 23 and its normal access area 24 to satisfy the conditions required by this memory area setting command.

Although the above embodiment describes with FIGS. 2 and 3 the case in which the temporary area setting process response (response) ResSet (S202, S208) is returned from the nonvolatile storage device 2 to the access device 1, the present invention should not be limited to this structure. For example, the response may not be returned.

Although the above embodiment describes the case in which the memory area setting command and the format command are separate commands, the present invention should not be limited to this structure. For example, the format command may additionally include the information carried by the memory area setting command, and only the format command may be transmitted from the access device to the nonvolatile storage device. In this case, the nonvolatile storage device sets the temporary area and the normal access area and further logically formats the normal access area in response to the single command. When detecting an error in any of these processes, the nonvolatile storage device may transmit a response including error information to the access device. When all of these processes are completed successfully, the nonvolatile storage device may transmit a response including information indicating successful completion of the processes to the access device.

Although the above embodiment describes the case in which the access device and the nonvolatile storage device are separate devices, the present invention should not be limited to this structure. The access device and the nonvolatile storage device and further the external bus connecting the access device and the nonvolatile storage device may be incorporated in a single device.

Each block of the nonvolatile storage system, the access device, and the nonvolatile storage device described in the above embodiment may be formed using a single chip with a semiconductor device, such as LSI (large-scale integration), or some or all of the blocks of the nonvolatile storage system, the access device, and the nonvolatile storage device may be formed using a single chip.

Although LSI is used as the semiconductor device technology, the technology may be IC (integrated circuit), system LSI, super LSI, or ultra LSI depending on the degree of integration of the circuit.

The circuit integration technology employed should not be limited to LSI, but the circuit integration may be achieved using a dedicated circuit or a general-purpose processor. A field programmable gate array (FPGA), which is an LSI circuit programmable after manufactured, or a reconfigurable processor, which is an LSI circuit in which internal circuit cells are reconfigurable or more specifically the internal circuit cells can be reconnected or reset, may be used.

Further, if any circuit integration technology that can replace LSI emerges as an advancement of the semiconductor technology or as a derivative of the semiconductor technology, the technology may be used to integrate the functional blocks. Biotechnology is potentially applicable.

The processes described in the above embodiment may be implemented using either hardware or software, or may be implemented using both software and hardware. When each of the nonvolatile storage system, the access device, and the nonvolatile storage device of the above embodiment is implemented by hardware, the nonvolatile storage system, the access device, and the nonvolatile storage device require timing adjustment for their processes. For ease of explanation, timing adjustment associated with various signals required in an actual hardware design is not described in detail in the above embodiment.

The specific structures described in the above embodiment are mere examples of the present invention, and may be changed and modified variously without departing from the scope and spirit of the invention.

INDUSTRIAL APPLICABILITY

The nonvolatile storage system, the access device, and the nonvolatile storage device of the present invention enable data recording to be performed in an optimum manner for intended use, and are useful and implementable in the nonvolatile memory-related industries.

The invention claimed is:

1. A memory controller that can be connected to a nonvolatile memory including physical blocks and reads and writes data from and to the nonvolatile memory in accordance with an access command provided from an external unit, the memory controller comprising:
a use condition obtaining unit that obtains information about a number of physical blocks of the nonvolatile memory to be used as temporary blocks from the access command provided from the external unit;
a usable capacity determination unit that determines a capacity of a temporary area and a capacity of a normal access area based on the number of temporary blocks obtained by the use condition obtaining unit, the temporary area being formed by the temporary blocks, the normal access area being formed by physical blocks of the nonvolatile memory that are different from the temporary blocks; and
a data read/write unit that writes data to either one of the temporary area or the normal access area determined by the usable capacity determination unit.

2. The memory controller according to claim 1, wherein the usable capacity determination unit determines the temporary area and the normal access area of the nonvolatile memory by determining the number of temporary blocks as 1 when single-channel data consisting of data corresponding to a single channel is to be recorded onto the nonvolatile memory, and determining the number of temporary blocks as N when multi-channel data consisting of data corresponding to N channels is to be recorded onto the nonvolatile memory, N being a natural number greater than 1 and less than infinity.

3. A nonvolatile storage device, comprising:
the memory controller according to claim 1,
a nonvolatile memory including the temporary area and the normal access area; and
wherein at least one of the capacity of the temporary area or the capacity of the normal access area included in the nonvolatile memory is changeable in accordance with a command provided from the memory controller.

4. An access device connectable to the nonvolatile storage device according to claim 3 for formatting the nonvolatile storage device, writing data to the nonvolatile storage device, and reading data from the nonvolatile storage device, the access device comprising:
a use condition designation unit that transmits a use condition to the nonvolatile storage device to designate the use condition to be used by the nonvolatile storage device; and
a formatting unit that transmits a command for formatting to the nonvolatile storage device based on a response, from the nonvolatile storage device, to the designated use condition transmitted by the use condition designation unit, the response including information about a usable capacity of a memory of the nonvolatile storage device that is determined by the nonvolatile storage device based on the use condition.

5. The access device according to claim 4, wherein
the use condition designation unit designates the use condition to be used by the nonvolatile storage device based on information including the number of temporary blocks to be included in the temporary area, and
the usable capacity of the memory is a memory capacity of the normal access area that is set as an area remaining after excluding the temporary area that is determined using the number of temporary blocks from the entire memory area that is usable to at least one of read data or write data by the nonvolatile storage device.

6. A nonvolatile storage system, comprising:
a nonvolatile storage device including:
the access device according to claim 4;
a nonvolatile memory including a variable memory area formed by physical blocks; and
a memory controller connectable to the nonvolatile memory and reads and writes data from and to the nonvolatile memory in accordance with an access command provided from the access device, the memory controller including:
a use condition obtaining unit that obtains information about a number of physical blocks of the nonvolatile memory to be used as temporary blocks from the access command provided from the access device unit;
a usable capacity determination unit that determines a capacity of a temporary area and a capacity of a normal access area based on the number of temporary blocks obtained by the use condition obtaining unit, the temporary area being formed by the temporary blocks, the normal access area being formed by the physical blocks of the nonvolatile memory that are different from the temporary blocks; and
a data read/write unit that writes data either one of the temporary area or the normal access area determined by the usable capacity determination unit, wherein at least one of the capacity of the temporary area or the capacity of the normal access area included in the nonvolatile memory is changeable in accordance with a command provided from the memory controller.

7. The memory controller according to claim 1, wherein the usable capacity determination unit determines the capacity of the temporary area in accordance with the number of channels of data to be written to the nonvolatile memory by the data read/write unit.

* * * * *